(12) United States Patent
Agiman

(10) Patent No.: US 6,456,050 B1
(45) Date of Patent: Sep. 24, 2002

(54) VIRTUAL FREQUENCY-CONTROLLED SWITCHING VOLTAGE REGULATOR

(76) Inventor: Dan Agiman, 2 Photinia, Irvine, CA (US) 92620

( * ) Notice: Subject to any disclaimer, the term of this patent is extended or adjusted under 35 U.S.C. 154(b) by 0 days.

(21) Appl. No.: 10/007,011

(22) Filed: Nov. 5, 2001

(51) Int. Cl.[7] ................................. G05F 1/40
(52) U.S. Cl. .................................... 323/282
(58) Field of Search ................. 323/282, 285, 323/287, 351

(56) References Cited

U.S. PATENT DOCUMENTS

| | | | |
|---|---|---|---|
| 4,145,650 A | 3/1979 | Poppinger et al. | 323/17 |
| 4,321,526 A | 3/1982 | Weischedel | 323/286 |
| 4,959,606 A | 9/1990 | Forge | 323/286 |
| 5,481,178 A * | 1/1996 | Wilcox et al. | 323/287 |
| 5,731,694 A * | 3/1998 | Wilcox et al. | 323/287 |
| 5,912,552 A * | 6/1999 | Tateishi | 323/285 |
| 5,929,620 A | 7/1999 | Dobkin et al. | 323/288 |
| 5,994,885 A * | 11/1999 | Wilcox et al. | 323/285 |
| 6,281,668 B1 | 8/2001 | Sudo | 323/299 |
| 6,304,066 B1 * | 10/2001 | Wilcox et al. | 323/282 |

* cited by examiner

*Primary Examiner*—Adolf Deneke Borhane
(74) *Attorney, Agent, or Firm*—Bromberg & Sunstein LLP (57) ABSTRACT

A control voltage is generated as a function of on-time and off-time of a main regulator loop in response to apparent duty cycle of a voltage regulator circuit. Such control voltage is used in a circuit as to yield a virtual constant frequency of operation. No external compensation is required. This reduces external connections while maintaining stable, accurate, constant frequency operation of a switching voltage regulator circuit.

48 Claims, 7 Drawing Sheets

VIRTUAL FREQUENCY-CONTROLLED SWITCHING VOLTAGE REGULATOR

FIELD OF THE INVENTION

The invention generally relates to electronic power supplies, and more specifically, to pulse modulation in a switching voltage regulator.

BACKGROUND ART

Figure 1:
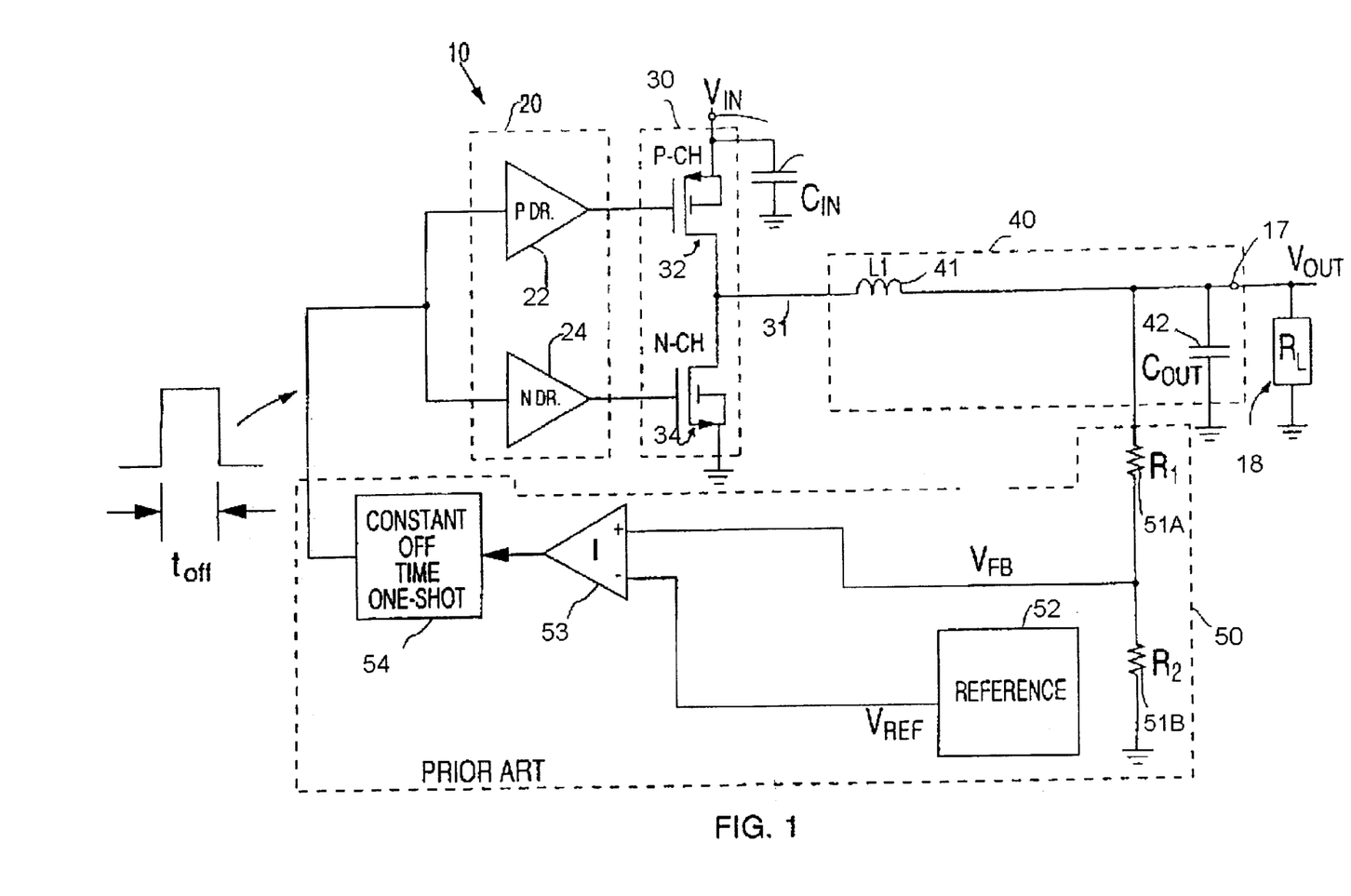
FIG. 1 shows a typical prior art step down switching regulator.

Pulse-controlled switching voltage regulators, such as constant off-time/on-time regulators, have the advantage of short reaction time to transient conditions and simplicity of operation. FIG. 1 shows a typical constant off-time step-down switching voltage regulator. The regulator 10 provides a regulated DC voltage $V_{OUT}$ at terminal 17 to drive a load 18. Driver circuit 20 synchronously drives push-pull power switch 30, which includes p-channel MOSFET 32 and n-channel MOSFET 34. Output circuit 40 includes an output inductor 41 and an output capacitor 42, which act together as a filter that smoothes the output ripple current.

A control circuit 50 acts upon the driver circuit 20 and power switch 30 to regulate the output voltage at terminal 17. Control circuit 50 includes the feedback resistor dividers R51A and R51B that generate a feedback signal $V_{FB}$ proportional to $V_{OUT}$, a reference circuit 52, a feedback comparator 53, and constant off-time one shot 54. The control circuit 50 operates to force the reference voltage $V_{REF}$ upon the feedback voltage $V_{FB}$, thereby controlling the output voltage $V_{OUT}$. When $V_{FB}$ is less than $V_{REF}$, the output of comparator 53 is low, and output of one shot 54 also is low. Driver circuit 20 provides a low level to turn on the p-channel MOSFET 32, and turn off the n-channel MOSFET 34. This condition will be referred to as the power switch 30 being "on". Power switch 30 then applies the input voltage $V_{IN}$ to the output circuit 40, increasing the inductor current and charging the output capacitor 42, while providing power to the load 18.

This situation continues until $V_{FB}$ exceeds $V_{REF}$. At that point, the comparator 53 generates a signal to trigger the one shot 54. One shot 54 in turn provides a high level pulse to the driver circuit 20 to turn off the power switch 30. This causes a decrease in the current provided to the output circuit 40, thus decreasing the output voltage $V_{OUT}$.

At the termination of the pulse from one shot 54, the power switch 30 turns on again and the cycle repeats. This operation causes a small output ripple in $V_{OUT}$. The down slope of the ripple is constant and directly proportional to the duration of the off-time pulse $T_{OFF}$ from one shot 54. The up slope of the ripple is proportional to the on-time of the power switch 30.

One drawback of this approach is the undesirable variation in the frequency due to variation in on-time of power switch 30. On-time is proportional to input voltage $V_{IN}$, output voltage $V_{OUT}$, and other factors such as voltage drops across power switch 30 and printed circuit trace resistance. For example, if the difference between $V_{IN \, and \, VOUT}$ doubles, then the on-time of power switch 30 will halve. Switching frequency, however, will change less because it involves both on- and off-times. Nevertheless, conditions could cause switching frequency to vary by more than 300%. This wide frequency variation translates into output ripple variation, and degrades the overall performance of the voltage regulator 10.

Another disadvantage of the traditional prior art is the occasional overly extended on-time. The power switch 30 remains on until $V_{FB}$ reaches $V_{REF}$. In applications where the p-channel MOSFET 32 is replaced with an n-channel MOSFET, a scheme called "bootstrap" is commonly used. In bootstrapping, as power switch 30 alternates between on and off, an external capacitor is used to provide enough voltage for the top n-channel MOSFET to properly conduct current. This requires continued switching. If the control circuit 50 creates an overly extended on-time, the bootstrap operation will be defeated. This will result in a loss of sufficient drive to the top MOSFET, and collapse of the output voltage $V_{OUT}$.

Yet another disadvantage of the prior art as shown in FIG. 1 is the inability to detect light load conditions and turn off the power switch 30 under such conditions. This should be done in order to reduce switching losses and prevent output capacitor discharge, thus increasing overall efficiency at light loads.

The circuit in FIG. 1 proves stable and simple to implement in buck switching regulators, where input voltage is higher than output voltage. However, the attendant frequency variation may not be acceptable in some applications needing optimized external components. In some applications, for example, the external components may be selected based on performance, specification, and cost, to provide a given output ripple voltage at a specified frequency. If the frequency varies unreasonably, the output ripple will degrade from optimum to less than optimum.

A need arises for a pulse modulation approach that compensates for frequency variation so as to keep output ripple at optimum level. Additionally, a constant frequency may be needed where it is important to avoid noise sensitive regions such as the 455 KHz IF band.

Figure 2:
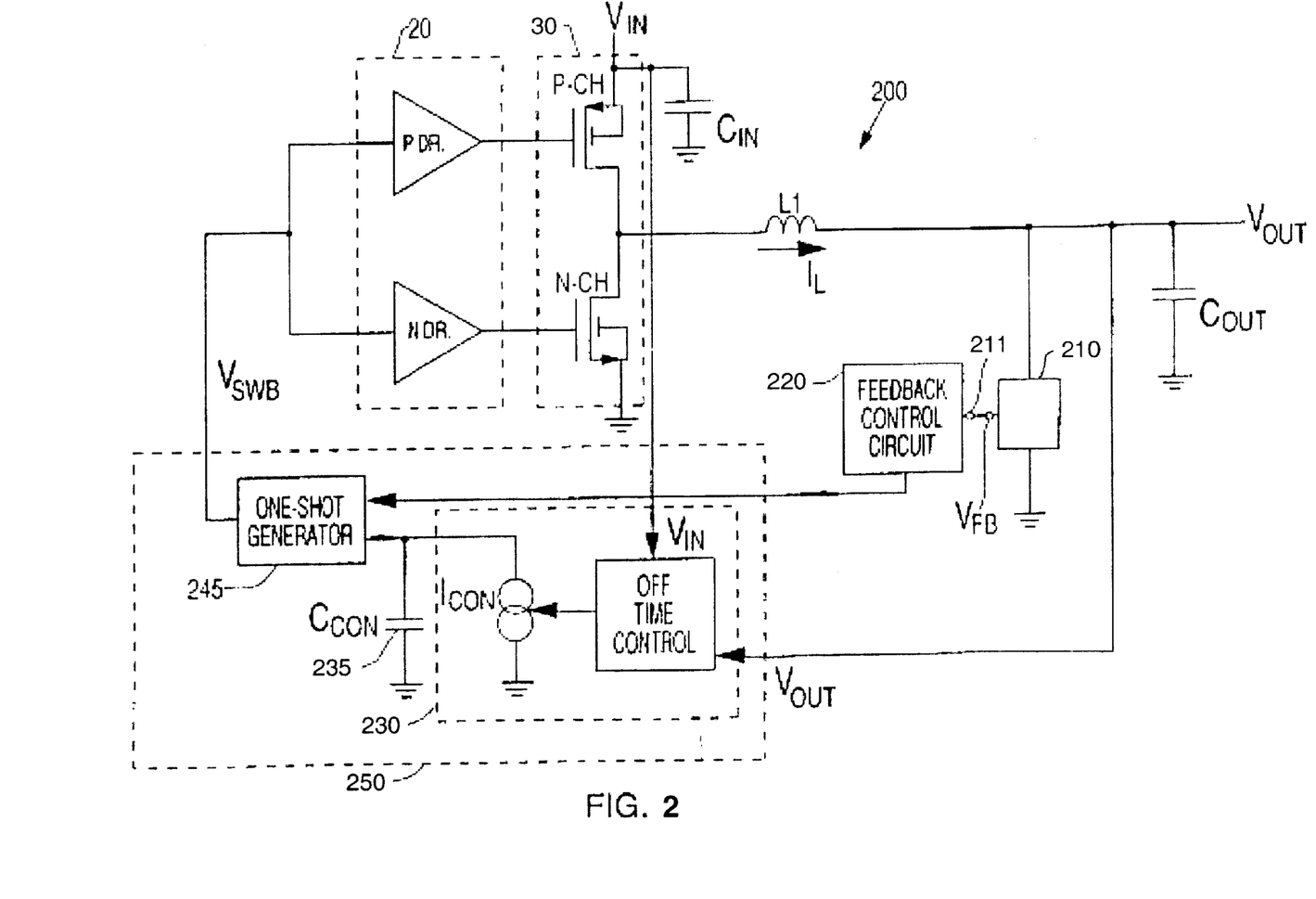
FIG. 2 shows one prior art approach intended to improve performance of the circuit shown in FIG. 1.

FIG. 2 shows one prior art attempt, described in U.S. Pat. No. 5,994,885 (incorporated herein by reference), to address some of these issues via off-time modulation. Off time control 230 receives signals from both the input voltage $V_{IN}$, and the output voltage $V_{OUT}$. An internal algorithm is then used to modulate a control current $I_{CON}$ that discharges off-time capacitor $C_{CON}$. This generates a variable duration pulse at the output of one shot generator 245. As $V_{IN}$ increases relative to $V_{OUT}$, on-time is reduced. This can be understood by examining the equation:

$$T_{ON} = L\left(\frac{I_L}{V_L}\right)$$

where L is inductance, $I_L$ is inductor current, and $V_L$ is voltage across the inductor. To compensate for reduction in the switch on-time, off-time control circuit 230 reduces the off-time discharge current ICON to increase the discharge time of $C_{CON}$. This causes an increase in the switch off-time. Similarly, when $V_{IN}$ decreases relative to $V_{OUT}$, switch on-time increases. The off time control 230 increases the discharge current $I_{CON}$ to reduce the discharge time of $C_{CON}$, thus reducing the switch off-time. The net result is reduced variation in the apparent operating frequency.

One disadvantage of this approach, however, is the need for physical connections to $V_{IN}$ and $V_{OUT}$. In most applications, feedback resistor divider 210 is set externally. So for a true connection to $V_{OUT}$, an additional external terminal is needed. Another disadvantage is the lack of a refresh pulse needed for bootstrap applications where a capacitor needs to be continually switched in order to provide sufficient drive to the top n-channel MOSFET. Yet another disadvantage is the failure to take into effect other factors that influence frequency variation, such as but not limited to switch and trace resistance.

SUMMARY OF THE INVENTION

Representative embodiments of the present invention variously include a control circuit for a switching voltage regulator, a method of controlling a switching voltage regulator, and a switching voltage regulator. A power switching module operates at a duty cycle and provides a regulated output. A feedback circuit produces a feedback signal representative of the regulated output. A timing control circuit produces a timing signal responsive to the duty cycle of the power switching module. A control module is triggered by the feedback signal to produce an output pulse to control the regulated output. The output pulse has a duration determined by the timing signal.

In a further embodiment, the control module may be based on a constant off-time approach, or a constant on-time approach. The timing control circuit may sense the regulator duty cycle at the output of the control module, at the power switching module, or from voltage ripple in the feedback signal. A control capacitance responsive to the duty cycle may be used to produce the timing signal. In such an embodiment, the control capacitance may be charged or discharged at a rate responsive to the duty cycle. Alternatively, a control capacitor may be charged at a rate responsive to the duty cycle.

A further embodiment may include a maximum duty cycle comparator to cause a change in a logic state of the output pulse after an over-extended period of time when the duty cycle is greater than during normal regulator operation. Yet another embodiment may include a minimum duty cycle comparator to place the power stage into a high impedance state after an over-extended period of time when the duty cycle is less than during normal regulator operation, so as to increase overall efficiency of the regulator under light loads.

In one embodiment, a duty cycle voltage is produced that is representative of the duty cycle. In addition or alternatively, a pulse duration voltage may be produced that is representative of the duration of the output pulse. The timing signal may be further responsive to the duration of the output pulse.

In any of the above embodiments, the off-time of the regulator may be inversely proportional to either the duty cycle or duration of the output pulse, so as to maintain a constant operating frequency. Alternatively, the on-time may be proportional to the duty cycle so as to maintain a constant operating frequency.

BRIEF DESCRIPTION OF THE DRAWINGS

The present invention will be more readily understood by reference to the following detailed description taken with the accompanying drawings, in which.

DETAILED DESCRIPTION OF SPECIFIC EMBODIMENTS

Various embodiments of the present invention are directed to techniques for providing a constant operating frequency for pulse controlled switching voltage regulators without undesirable direct connections to external terminals such as for input and/or output voltages.

First, it is useful to consider the concept of duty cycle in a switching voltage regulator. Duty cycle represents the ratio of the switch on-time, $T_{ON}$, relative to the entire switching period $T$ $(=T_{ON}+T_{OFF})$:

$$Duty\ Cycle = \frac{T_{ON}}{T_{ON} + T_{OFF}}$$

Zero duty cycle means no on-time of the power switch, and 100% duty cycle means that the power switch is on continuously. Interestingly, regardless of the operating frequency of the switching regulator, duty cycle to a first order is the output voltage $V_{OUT}$ divided by the input voltage $V_{IN}$. Thus, for a given $V_{OUT}$ and $V_{IN}$, the duty cycle ratio to a first order is constant. Embodiments of the present invention exploit this relationship to avoid external physical connections to the input and output terminals.

Figure 3:
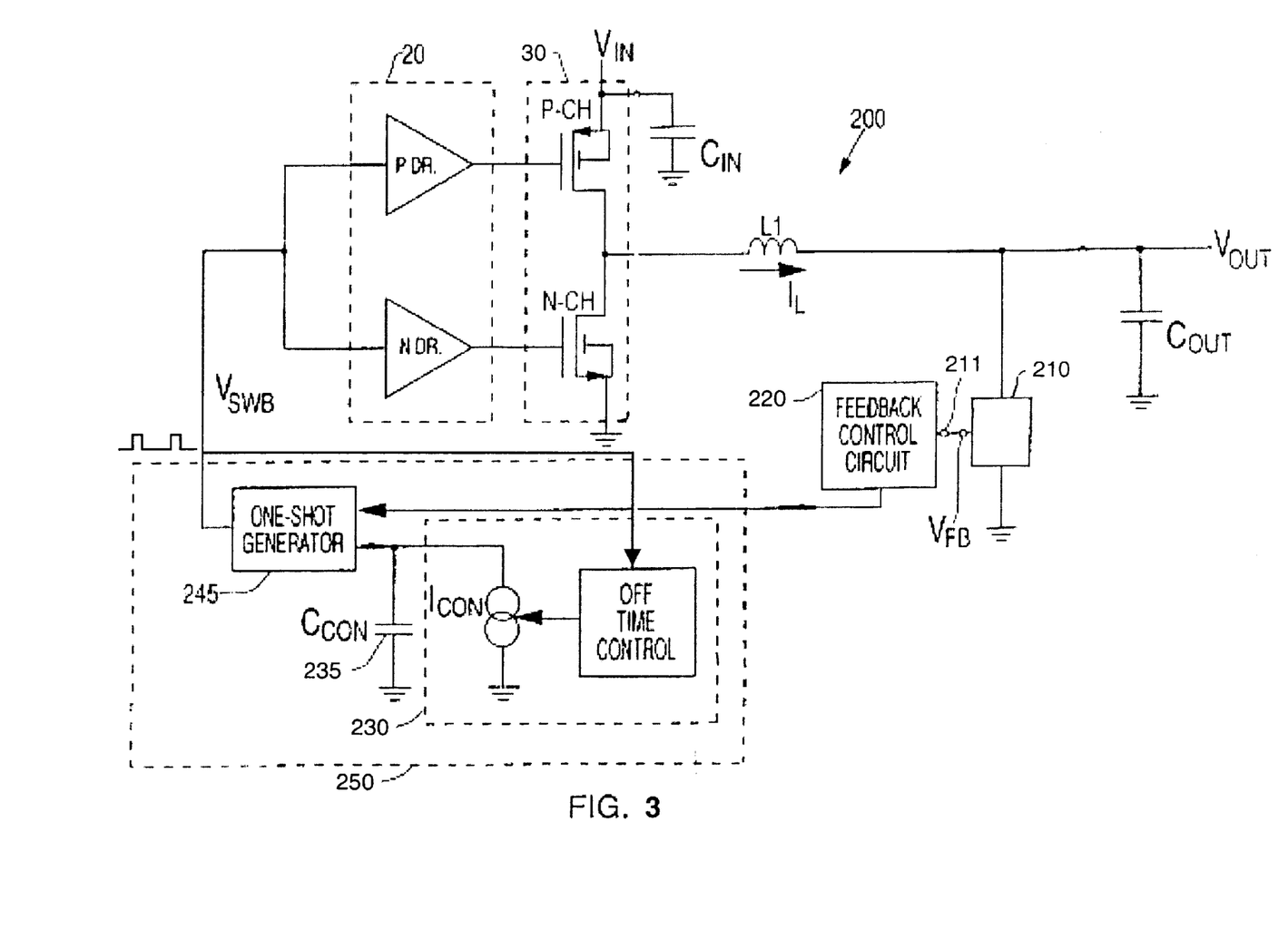
FIG. 3 shows one typical embodiment of the present invention.
Figure 4:
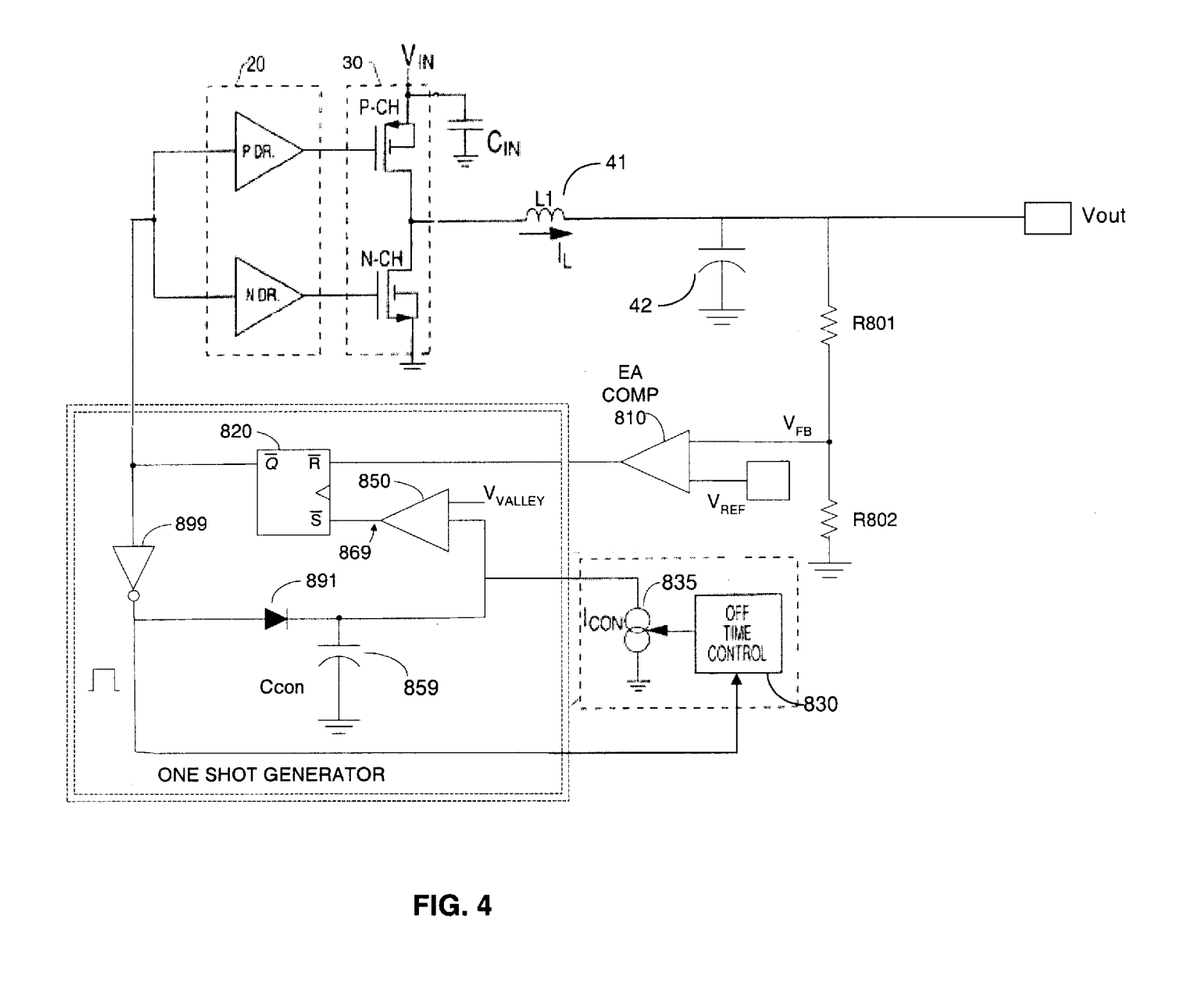
FIG. 4 shows a switching regulator according to one embodiment.

FIG. 3 shows a typical embodiment of the present invention, which has similar operation to the prior art discussed in FIG. 2, but instead of needing external connections to $V_{IN}$ and $V_{OUT}$, a single connection is made to an internal node $V_{SWB}$. FIG. 4 shows the one shot generator of FIG. 3 in greater detail. When feedback voltage $V_{FB}$ (representative of the output voltage $V_{OUT}$) increases above reference voltage $V_{REF}$, EA comparator 810 generates a logic low signal that resets PWM latch 820. The Q-not output of the PWM latch 820 transits from low to high, turning off power switch 30. The high at the Q-not output of the PWM latch 820 also is inverted to a low by inverter 899, reverse biasing charge diode 891. This allows off-time capacitor $C_{CON}$ 859 to discharge at a rate dictated by the control current $I_{CON}$ 835. An alternative arrangement may be based on controlling the rate of charging the off-time capacitor $C_{CON}$ 859, or charge or discharge an inductance instead of a capacitance.

As the voltage across $C_{CON}$ 859 drops below the valley voltage at $V_{VALLEY}$, valley comparator 850 generates a low-level signal at its output and sets the PWM latch 820. The Q-not of the PWM latch 820 then transits from high to low, turning on the power switch 30. The output of inverter 899 transits from low to high, forward biasing charge diode 891, and charging control capacitor $C_{CON}$ 859. Off time controller 830 is responsive to the duration of the output pulse from the one-shot PWM latch 820. Moreover, the regulator off-time is responsive to the regulator duty cycle, which includes effects of input voltage, output voltage, trace and switch resistance, etc.

FIG. 3 shows the off-time control 230 sensing the duty cycle by monitoring the $V_{SWB}$ output of the one-shot generator 245. This could be in the form of a voltage representing the duration of the output pulse from the PWM latch 820. Of course, in various specific embodiments, it may be advantageous to sense duty cycle from some other convenient point in the system. For example, the duty cycle feedback signal could be arranged to monitor the input or output of the power switch 30. Or, the ripple in the feedback voltage $V_{FB}$ could be processed to determine the duty cycle.

Figure 5:
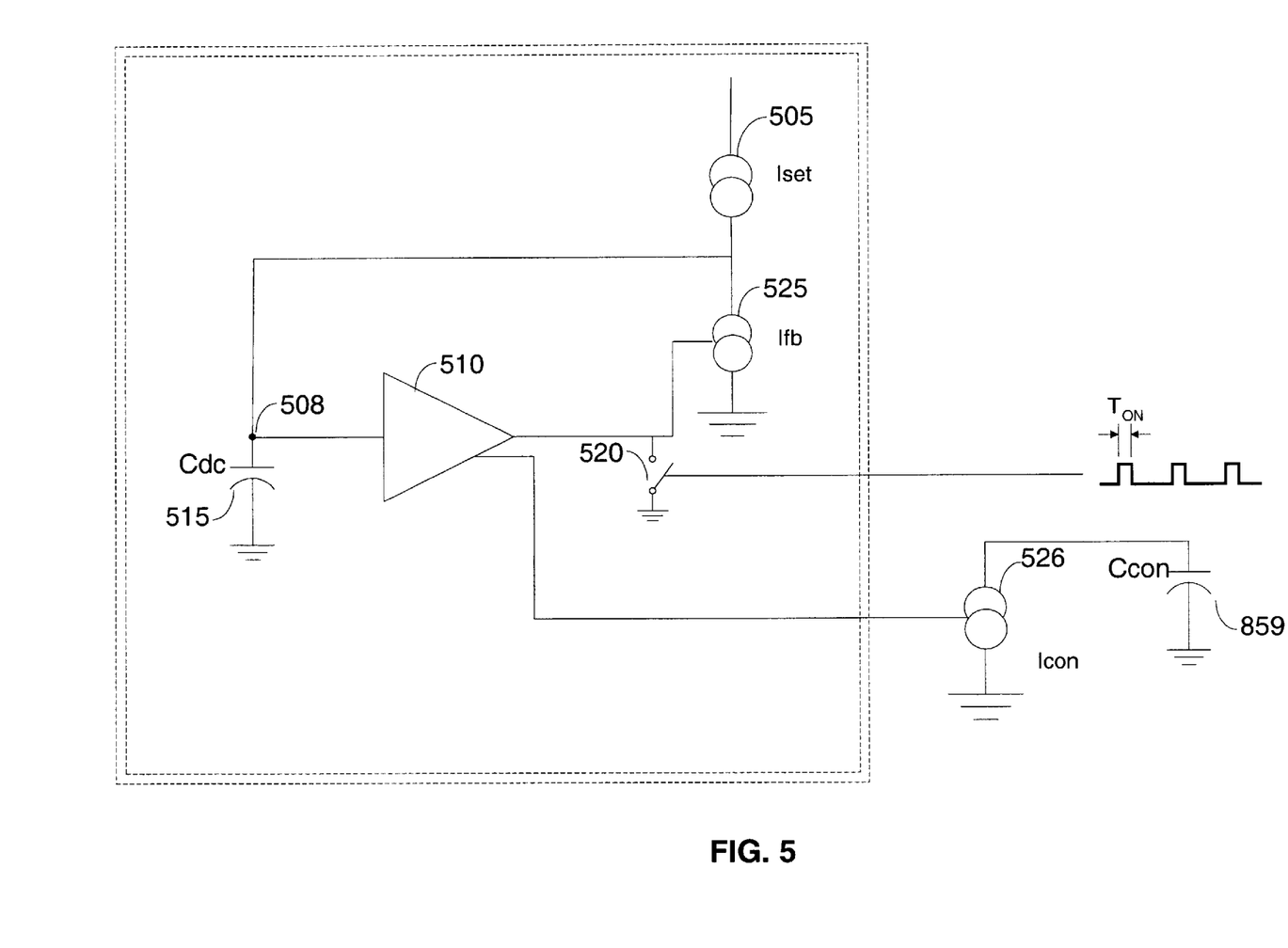
FIG. 5 shows a detailed block diagram of the variable off time control circuit of various embodiments.

FIG. 5 shows various functional details the off-time control block, 830 in FIG. 4. Shown are a constant current source $I_{SET}$ 505, a current steering switch 520, a duty cycle sampling capacitor $C_{DC}$ 515, a duty cycle feedback amplifier 510, a duty cycle feedback current source $I_{FB}$ 525, and the control current $I_{CON}$ 526. The current steering switch 520 is controlled by the regulator on-time signal. During the on-time, current steering switch 520 is closed, and during the off-time, the switch is open. When the switch is closed, the duty cycle feedback current source $I_{FB}$ 525 is disabled, and the constant current source $I_{SET}$ 505 charges the duty cycle sampling capacitor $C_{DC}$ 515. When the current steering switch 520 is open the duty cycle feedback current source $I_{FB}$ 525 overpowers the constant current source $I_{SET}$ 505 and discharges the duty cycle sampling capacitor $C_{DC}$ 515. This alternating action creates a small ripple signal at node 508 with a larger DC voltage. The duty cycle feedback amplifier 510 controls the duty cycle feedback current source $I_{FB}$ 525 to cause a discharge of the duty cycle sampling capacitor $C_{DC}$ 515 until the voltage at node 508 stabilizes at a level corresponding to an actual main loop duty cycle. This dc voltage at node 508 is then in true correlation with the overall actual duty cycle of the switching regulator's main loop. Larger duty cycle translates into higher voltage on the duty cycle sampling capacitor $C_{DC}$ 515 at node 508, and higher feedback current $I_{FB}$. The duty cycle feedback current $I_{FB}$ is a mirror of the control current $I_{CON}$. The magnitude of $I_{CON}$ is best described by the following equation:

$$I_{CON} = \frac{I_{SET}(T_{ON} + T_{OFF})}{T_{OFF}}k$$

where k is a constant, $T_{ON}$ is the on-time, and $T_{OFF}$ is the off-time. Alternatively the equation can be reduced to:

$$I_{CON} = \frac{I_{SET}T}{T_{OFF}}k$$

where $T=T_{ON}+T_{OFF}$, or the period, and the off-time $T_{OFF}$ is described by:

$$T_{OFF} = \frac{C_{CON}\Delta V}{I_{CON}}$$

where $\Delta V$ is the voltage across $C_{CON}$. Clearly a current is established which is proportional to $I_{SET}$, and inversely proportional to Toff/T.

Consider the operation of the circuit based on the previous equation, assuming a sudden change in the apparent duty cycle of the main loop due to input, output, or any other condition. With $T_{OFF}$ initially being fixed due to stabilized dc sampling voltage at node 508 and the instant change in the on-time, there will be a momentary change in the duration of the period T. This change in the period T causes a change in the control current $I_{CON}$. That, in turn, changes $T_{OFF}$ and consequently changes T.

For example, assume that the difference voltage between $V_{IN}$ and $V_{OUT}$ is suddenly reduced. With $T_{OFF}$ momentarily unchanged due to the previously set voltage at node 508, the initial response would be for the on-time to increase, and consequently an increase in the period T. Based on the previous equation, and assuming $T_{OFF}$ still unchanged, the control current Icon will increase. An increase in Icon forces a reduction in $T_{OFF}$ and T, which then causes a reduction in the control current $I_{CON}$. Thus, a duty cycle control loop is created that automatically adjusts the control current $I_{CON}$ in response to duty cycle variation. The overall result is a stable, fixed operating frequency. Similarly, different output voltages will result in different duty cycles, which will act on the off-time to yield a constant fixed operating frequency. To ensure stable operation of the duty cycle control loop, the duty cycle capacitor $C_{DC}$ 515 is made larger than the control capacitor $C_{CON}$ 859.

Figure 6:
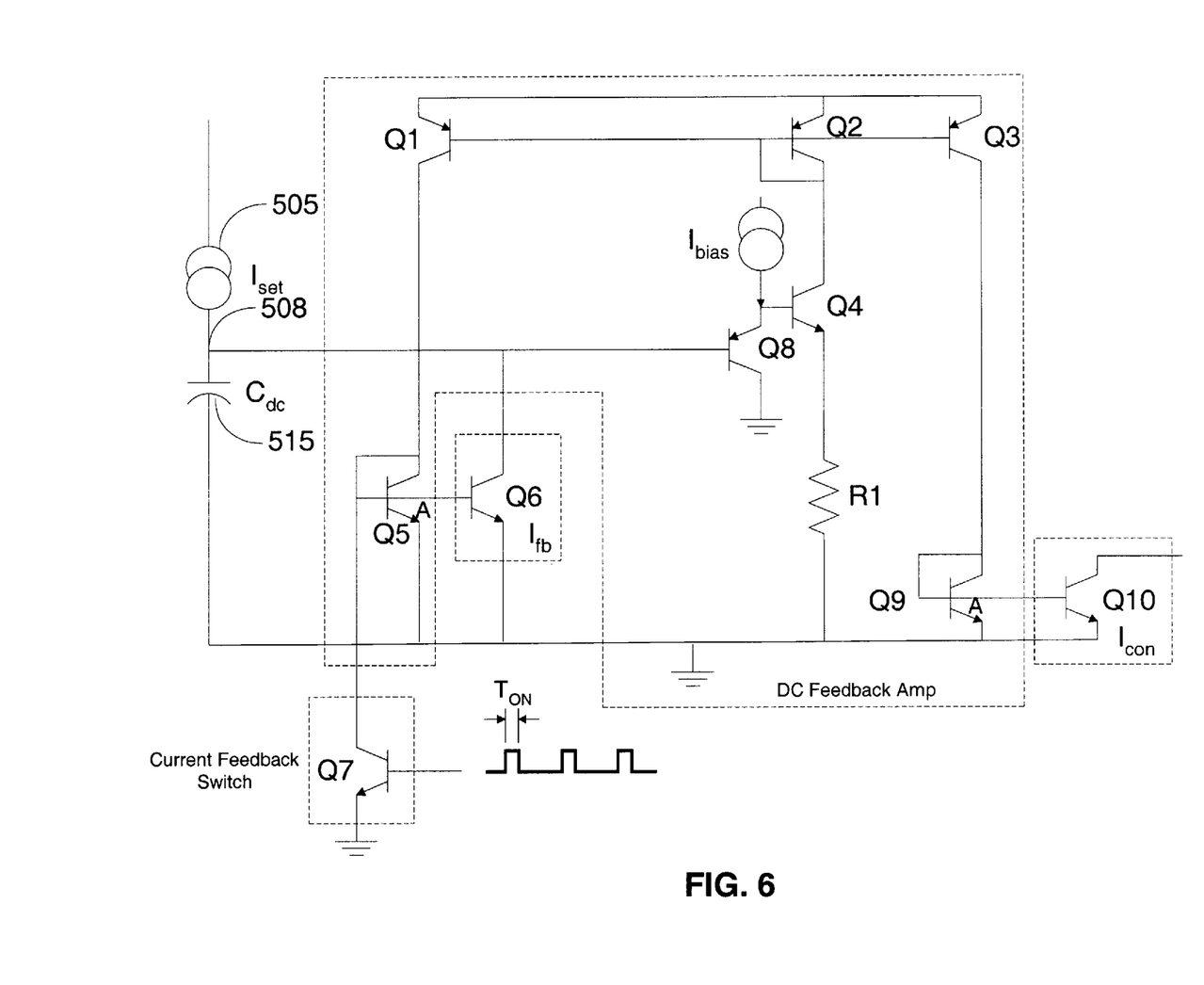
FIG. 6 shows a detailed circuit schematic implementation of FIG. 5.

FIG. 6 shows a detailed circuit schematic of one implementation of the duty cycle control loop in FIG. 5. The set current $I_{SET}$ 505 is shown connected to the duty cycle sampling capacitor $C_{DC}$ 515 at node 508. Q7 is the current steering switch 520. Q6 is the duty cycle feedback current source $I_{FB}$ 525. The control current source $I_{CON}$ 526 is Q10. The duty cycle feedback amplifier 510 includes Q1, Q2, Q3, Q4, Q5, Q8, Q9, R1, and an internal bias current $I_{BIAS}$. The area factor "A" of Q5 and Q9 can be changed to accommodate wider range of operation. A=2 is one option. The variation of $I_{FB}$ is accomplished by the duty cycle voltage at node 508 being imposed across resistor R1 in FIG. 6, generating current proportional to the voltage at node 508 of the duty cycle sampling capacitor $C_{DC}$ 515.

Figure 7:
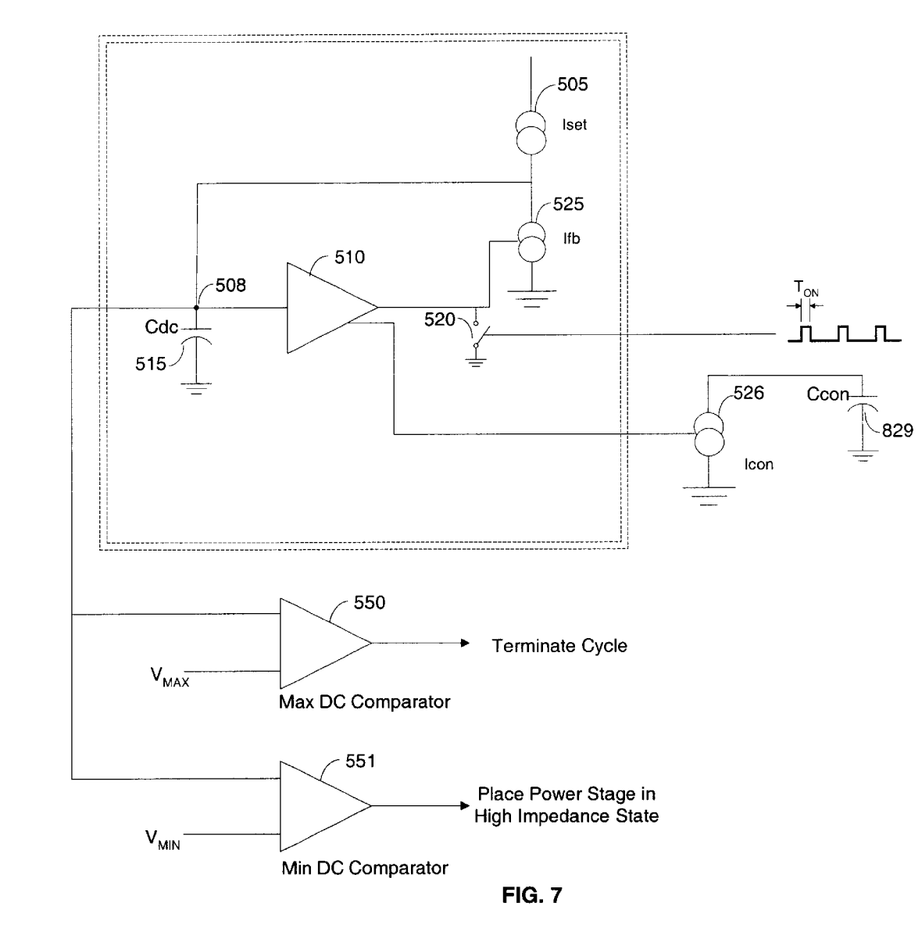
FIG. 7 shows a second embodiment of the present invention.

FIG. 7 shows functional blocks in a second embodiment of the present invention. It depicts the addition of a maximum duty cycle comparator 550 and a minimum duty cycle comparator 551. It was already established in the discussion of FIG. 5 that a voltage is developed across the duty cycle sampling capacitor 515 at node 508 that correlates to the duty cycle of the overall regulator's main loop. The higher the voltage at node 508, the greater the duty cycle.

Incorporating the maximum duty cycle comparator 550 and providing a variable voltage reference, $V_{MAX}$, a mean is established to limit the maximum duty cycle of the regulator. This established limit is within the linear region of operation, not an additional signal from a separate circuit. In other words, the output signal from the maximum duty cycle comparator 550 can be used to terminate the main switch on-time. This prevents the regulator from operating in overly extended on-time mode. The term overly extended mode is used to distinguish from a normal extended mode that can still be realized. A need for a normal extended on-time mode is defined when the load requirements are rapidly changing. An example is where load current needs to rise from very small to very large, such as the powering of a computer microprocessor. Assuming that load initially is very light or minimum, the voltage at node 508 will be at a designated stable value (less than the maximum value), which corresponds to the actual duty cycle. Upon sensing the sudden increased demand of load current, the voltage at node 508 will slowly rise towards the maximum. Termination of the on-time will not occur until the voltage across the duty cycle sampling capacitor $C_{DC}$ 515 exceeds the maximum duty cycle reference voltage $V_{MAX}$. Thus a mean level is established that provides for an extended regulator switching on-time to respond to momentary transient conditions.

On the other hand, an overly extended on-time due to very heavy load is prevented by the maximum duty cycle comparator 550 terminating the regulator on-time. This ensures a refresh pulse to accommodate applications requiring continuous switching such as bootstrap applications.

An excessively light load condition can be handled by a minimum duty cycle comparator 551. Input $V_{MIN}$ can be set so that the threshold of the minimum duty cycle comparator 551 is well below the normal minimum duty cycle of the regulator. A transition to very light load condition will result in pulse skipping so that the overall off-time is much larger than normal. This in turn will cause the duty cycle sampling capacitor $C_{DC}$ 515 to discharge below the threshold of the minimum duty cycle comparator 551. The output of the minimum duty cycle comparator 551 would then place the power stage in a high impedance state. This will prevent the discharge of the output capacitor 42 during overly light load conditions. This approach results in increased regulator efficiency at light load condition.

It will be apparent to those of ordinary skill in the art that although the present invention has been discussed with reference to constant off-time control, it could be applied to other control schemes such as constant on-time control. Thus, the off-time may be inversely proportional to the duty cycle (or the duration of the pulse generator output pulse) so as to maintain a constant operating frequency. Or, the on-time may be proportional to the duty cycle so as to maintain a constant operating frequency.

Additionally the power switches discussed as complimentary P-Channel Mosfet and N-Channel Mosfet, could be changed to N-channel Mosfets only, or other switches, and implemented in other technologies such as, but not limited to, bipolar technology.

One skilled in the art will thus appreciate that the present invention could also be practiced by other than the described embodiments. Such an example would include the use of an operational amplifier in the duty cycle control loop. Another example would be the modulation of the valley voltage instead of the control current to control the off-time.

Thus, although various exemplary embodiments of the invention have been disclosed, it should be apparent to those skilled in the art that various changes and modifications can be made which will achieve some of the advantages of the invention without departing from the true scope of the invention.

What is claimed is:

1. A method of controlling a switching voltage regulator that operates at a duty cycle and provides a regulated output, the method comprising:
   producing a feedback signal representative of the regulated output, and a timing signal responsive to the regulator duty cycle; and
   creating, when triggered by the feedback signal, an output pulse to control the regulated output, the output pulse having a duration determined by the timing signal.

2. A method according to claim 1, wherein creating the output pulse is based on a constant off-time approach.

3. A method according to claim 1, wherein creating the output pulse is based on a constant on-time approach.

4. A method according to claim 1, wherein producing the timing signal includes sensing the regulator duty cycle at the output of the pulse generator.

5. A method according to claim 1, wherein producing the timing signal includes sensing the regulator duty cycle at a power switching arrangement within the regulator.

6. A method according to claim 1, wherein producing the timing signal includes determining the duty cycle from voltage ripple in the regulated output.

7. A method according to claim 1, wherein producing the timing signal includes sensing a control capacitance that is controlled responsive to the duty cycle.

8. A method according to claim 7, wherein controlling the control capacitance includes discharging the control capacitance at a rate responsive to the duty cycle.

9. A method according to claim 7, wherein controlling the control capacitance includes charging the control capacitance at a rate responsive to the duty cycle.

10. A method according to claim 1, further comprising:
    changing a logic state of the output pulse after an over-extended period of time when the duty cycle is greater than for normal regulator operation.

11. A method according to claim 1, further comprising:
    placing the regulated output in a high impedance state after an over-extended period of time when the duty cycle is less than for normal regulator operation.

12. A method according to claim 1, further comprising:
    generating a duty cycle voltage representative of the duty cycle of the regulator.

13. A method according to claim 1, further comprising:
    generating a pulse duration voltage representative of the duration of the output pulse.

14. A method according to claim 1, wherein the timing signal is further responsive to the output pulse.

15. A switching voltage regulator comprising:
    a power switching module that operates at a duty cycle to provide a regulated output;
    a feedback circuit to produce a feedback signal representative of the regulated output;
    a timing control circuit to produce a timing signal responsive to the duty cycle of the power switching module; and
    a control module triggered by the feedback signal to produce an output pulse to control the regulated output, the output pulse having a duration determined by the timing signal.

16. A switching voltage regulator according to claim 15, wherein the control module is based on a constant off-time approach.

17. A switching voltage regulator according to claim 15, wherein the control module is based on a constant on-time approach.

18. A switching voltage regulator according to claim 15, wherein the timing control circuit senses the regulator duty cycle at the output of the control module to produce the timing signal.

19. A switching voltage regulator according to claim 15, wherein the timing control circuit senses the regulator duty cycle at the power switching module to produce the timing signal.

20. A switching voltage regulator according to claim 15, wherein the timing control circuit senses the duty cycle from voltage ripple in the feedback signal to produce the timing signal.

21. A switching voltage regulator according to claim 15, wherein the timing control circuit uses a control capacitance responsive to the duty cycle to produce the timing signal.

22. A switching voltage regulator according to claim 21, wherein the control capacitance is discharged at a rate responsive to the duty cycle.

23. A switching voltage regulator according to claim 21, wherein the control capacitance is charged at a rate responsive to the duty cycle.

24. A switching voltage regulator according to claim 15, further comprising:
    a maximum duty cycle comparator to cause a change in a logic state of the output pulse after an over-extended period of time when the duty cycle is greater than during normal regulator operation.

25. A switching voltage regulator according to claim 15, further comprising:
    a minimum duty cycle comparator to place the regulated output in a high impedance state after an over-extended period of time when the duty cycle is less than during normal regulator operation.

26. A switching voltage regulator according to claim 15, wherein the control module further produces a duty cycle voltage representative of the duty cycle.

27. A switching voltage regulator according to claim 15, wherein the control module further produces a pulse duration voltage representative of the duration of the output pulse.

28. A switching voltage regulator according to claim 15, wherein the power switching module has an off-time that is inversely proportional to the duty cycle so as to maintain a constant operating frequency.

29. A switching voltage regulator according to claim 15, wherein the power switching module has an on-time that is proportional to the duty cycle so as to maintain a constant operating frequency.

30. A switching voltage regulator according to claim 15, wherein the timing signal is further responsive to the duration of the output pulse.

31. A switching voltage regulator according to claim 30, wherein the power switching module has an off-time that is inversely proportional to the duration of the output pulse so as to maintain a constant operating frequency.

32. A control circuit for a switching voltage regulator that operates at a duty cycle and provides a regulated output, the control circuit comprising:
- a pulse-time control circuit to sense the regulator duty cycle and produce a timing signal responsive to the duty cycle; and
- a pulse generator that is triggered by a feedback signal representative of the regulated output to produce an output pulse to control the regulated output, the output pulse having a duration determined by the timing signal.

33. A circuit according to claim 32, wherein the pulse generator is based on a constant off-time approach.

34. A circuit according to claim 32, wherein the pulse generator is based on a constant on-time approach.

35. A circuit according to claim 32, wherein the pulse-time control circuit senses the regulator duty cycle at the output of the pulse generator.

36. A circuit according to claim 32, wherein the pulse-time control circuit senses the regulator duty cycle at a power switching arrangement within the regulator.

37. A circuit according to claim 32, wherein the pulse-time control circuit senses the duty cycle from voltage ripple in the regulated output.

38. A circuit according to claim 32, wherein the pulse-time control circuit includes a control capacitance that is controlled responsive to the duty cycle.

39. A circuit according to claim 38, wherein the control capacitance is discharged at a rate responsive to the duty cycle.

40. A circuit according to claim 38, wherein the control capacitance is charged at a rate responsive to the duty cycle.

41. A circuit according to claim 32, further comprising:
- a maximum duty cycle comparator to cause a change in a logic state of the output pulse after an over-extended period of time when the duty cycle is greater than during normal regulator operation.

42. A circuit according to claim 32, further comprising:
- a minimum duty cycle comparator to place the regulated output in a high impedance state after an over-extended period of time when the duty cycle is less than during normal regulator operation.

43. A circuit according to claim 32, wherein the control circuit further produces a duty cycle voltage representative of the duty cycle.

44. A circuit according to claim 32, wherein the control circuit further produces a pulse duration voltage representative of the duration of the output pulse.

45. A circuit according to claim 32, wherein the pulse generator has an off-time that is inversely proportional to the duty cycle so as to maintain a constant operating frequency.

46. A circuit according to claim 32, wherein the pulse generator has an on-time that is proportional to the duty cycle so as to maintain a constant operating frequency.

47. A circuit according to claim 32, wherein the timing signal is further responsive to the duration of the output pulse.

48. A circuit according to claim 32, wherein the pulse generator has an off-time that is inversely proportional to the duration of the output pulse so as to maintain a constant operating frequency.

* * * * *